United States Patent
Sosin

(10) Patent No.: US 6,862,984 B2
(45) Date of Patent: Mar. 8, 2005

(54) METHOD AND DEVICE FOR MARKING GOLF BALLS

(76) Inventor: Howard Sosin, P.O. Box 138, South Port, CT (US) 06490

( * ) Notice: Subject to any disclaimer, the term of this patent is extended or adjusted under 35 U.S.C. 154(b) by 0 days.

(21) Appl. No.: 10/800,920

(22) Filed: Mar. 15, 2004

(65) Prior Publication Data

US 2004/0173109 A1 Sep. 9, 2004

Related U.S. Application Data

(63) Continuation of application No. 10/154,048, filed on May 23, 2002, now Pat. No. 6,742,449.
(60) Provisional application No. 60/298,744, filed on Jun. 15, 2001, now abandoned.

(51) Int. Cl.$^7$ .............................................. B41F 17/30
(52) U.S. Cl. ................................ 101/35; 101/DIG. 40; 73/65.02; 434/252; 473/353
(58) Field of Search .......................... 101/35, 41, 38.1, 101/DIG. 40; 73/65.02; 434/252; 33/613, 645, DIG. 21, 332, 574, 576, 666; 473/351, 353, 266, 268, 218

(56) References Cited

U.S. PATENT DOCUMENTS

| | | |
|---|---|---|
| 2,898,764 A | 8/1959 | Kinsey et al. |
| 4,111,038 A | 9/1978 | Olson et al. .................... 73/65 |
| 4,467,649 A | 8/1984 | Mueller ........................ 73/462 |
| 4,480,471 A | 11/1984 | Kögler et al. .................. 73/462 |
| 4,546,644 A | 10/1985 | Beny et al. ..................... 73/65 |
| 4,546,975 A | 10/1985 | Nims .......................... 473/447 |
| 4,860,578 A | 8/1989 | Movick ....................... 73/65.02 |
| 4,974,511 A | 12/1990 | Hsi-Chou ................... 101/38.1 |
| D323,301 S | 1/1992 | Cheng .......................... D10/82 |
| 5,248,878 A | 9/1993 | Ihara ...................... 219/121.69 |
| 5,450,791 A | 9/1995 | Prohm ......................... 101/333 |
| 5,564,707 A | 10/1996 | Dinh .......................... 473/218 |
| 5,632,205 A | 5/1997 | Gordon et al. .............. 101/483 |
| 5,651,741 A | 7/1997 | Masutani et al. ............ 473/200 |
| 5,832,819 A | 11/1998 | Widman ....................... 101/34 |
| 5,878,659 A | 3/1999 | Hatter .......................... 101/35 |
| 5,878,670 A | 3/1999 | Yamaguchi ................. 101/492 |
| 5,968,605 A | 10/1999 | Lutz ........................... 427/500 |
| 6,004,223 A | 12/1999 | Newcomb ................... 473/257 |
| 6,012,269 A | 1/2000 | Vitti ............................ 53/428 |
| 6,013,330 A | 1/2000 | Lutz ........................... 427/511 |
| 6,213,012 B1 | 4/2001 | Arms .......................... 101/35 |
| 6,216,587 B1 | 4/2001 | Foley .......................... 101/35 |
| 6,231,459 B1 | 5/2001 | Pettigrew et al. ........... 473/351 |
| 2003/0213289 A1 | 11/2003 | Burnett ..................... 73/65.02 |

OTHER PUBLICATIONS

PCT International Search Report for PCT/US 02/18846 mailed Feb. 12, 2003.
Dave Pelz (with James A. Frank). *Dave Pelz's Putting Bible*. New York: Doubleday, pp. 203–212 (2000).

*Primary Examiner*—Leslie J. Evanisko
(74) *Attorney, Agent, or Firm*—Choate, Hall & Stewart

(57) ABSTRACT

A method and device for marking golf balls that allows for the placement of a putting directional indicator (PDI) along the dynamic axis of a ball. While golfers could use the device to mark individual balls after they have been purchased (i.e. after they already have marks on them from the manufacturer), in preferred embodiments, the PDI is applied at the manufacturing stage and/or before the ball has other markings placed upon it. While the PDI could simply consist of one or more lines, in a preferred embodiment, the putting directional indicator may serve as an identifying mark for a manufacturer, distributor or consumer and may be designed to incorporate letters, words, symbols, short sentences, names, initials, numbers, images and photographs.

12 Claims, 5 Drawing Sheets

METHOD AND DEVICE FOR MARKING GOLF BALLS

RELATED APPLICATIONS

The present application is a continuation of U.S. patent application Ser. No. 10/154,048, filed May 23, 2002, now U.S. Pat. No. 6,742,449, dated Jun. 1, 2004, which claims priority to U.S. Provisional Ser. No. 60/298,744, filed Jun. 15, 2001, now abandoned, the teachings of all of which are incorporated herein by reference.

FIELD OF THE INVENTION

The present invention is directed to the field of golf balls and more particularly to a method and device for marking golf balls.

BACKGROUND OF THE INVENTION

A golfer must consider many variables when facing a putt. These variables including the slope(s) of the green, the type, cut, dampness and grain of the grass, the distance of the putt, and the weather (i.e. wind, rain, etc.). Data on many of these variables are available to the observant golfer. An analysis of all variables leads to a simultaneous decision as to how hard (the "speed") and in what direction (the "line") to strike the ball. It would seem that "all" that remains is for the golfer to step up to the ball and putt it along his intended line at his intended speed.

However, at least two residual problems plague the golfer. The first is an expected problem—he must not lose sight of his line as he steps up to execute the putt. The second is unexpected—the golfer in choosing the parameters of his putt typically assumes that, because his ball is spherical, the mass of the ball within the sphere will be completely balanced around the center point of the sphere. Thus, if he strikes the ball on the correct line at the correct speed the ball will travel on its intended course. While this is a reasonable assumption, it is generally not an accurate one. In particular, while most balls are virtually spherical (and those that are not can usually be weeded out by sight, or by mechanical means, e.g. dropping the ball through a ring repeatedly using different orientations for the ball), the center of mass cannot be immediately determined by sight and need not be located at the center of the sphere. This is problematic as it means that a perfectly executed putt may not travel along its intended path. Minor deviations mean missed putts.

Various devices exist to help the golfer with the first problem. These devices place one or more lines on golf balls to aid the golfer in aiming his ball once the intended speed and line have been determined. For example, U.S. Pat. No. 6,004,223 to Newcomb discloses a device that allows a golfer to draw a cross on a ball; and U.S. Pat. No. 5,564,707 to Dinh discloses a stencil consisting of various parallel and perpendicular lines that when placed on a ball is designed to aid alignment, the teachings of both of which are incorporated herein by reference.

Other devices attempt to deal with the second problem. These devices locate and mark the dynamic axis of a golf ball. For example, U.S. Pat. No. 4,546,644 to Beny, the teachings of which are incorporated herein by reference, discloses a device wherein: "[T]he dynamic axis of a sphere, e.g. golf ball, is located by spinning the sphere at high speed while it is supported on a low friction-bearing surface, thus allowing the desired stable axis to align itself with the spin axis. Markings indicative of the location of the stable axis are applied to the sphere." In particular, proper use of Beny's device results in a line being drawn around the equator of the golf ball. U.S. Pat. No. 4,111,038 to Olson et al., the teachings of which are incorporated herein by reference, discloses a kit and a method for marking golf balls (with a pen forming a mark) wherein "the axis of the golf ball including the mark, should always be placed perpendicular to the plane of the striking surface." Finally, U.S. Design Pat. No. Des. 323,301 to Cheng discloses a rotating axis marking unit for golf balls.

Despite these devices and methods for marking golf balls and determining dynamic axes, significant problems remain. Most golf balls come with markings placed on them by the manufacturer (e.g. the name of the manufacture, the type of ball, and an identification number), which are not intended to indicate a putting line or a dynamic axis. The addition of aiming lines can make the ball appear busy and make it difficult to successfully utilize the aiming lines. Interestingly, Dinh attempts to deal with this problem by incorporating into his stencil parts of the manufacturers markings. But since the manufacturer's markings do not account for the dynamic axis of the ball, clearly Dinh stencil will not be oriented optimally. The prior art devices find the dynamic axis by spinning the ball and marking the ball as it spins, thereby generating a circumferential line around the ball. Partial lines or markings other than lines (e.g. text) are not possible.

Many of the prior art devices and methods utilize non-permanent marking techniques, and all require significant work on the part of golfer.

Dave Pelz has addressed the problem of locating and marking the dynamic axis of a golf ball in his book *Dave Pelz's Putting Bible* (New York: Doubleday, 2000, pp. 203–212). Pelz suggests the use of a device (which he markets) to spin a golf ball and then hand marking a line along the equator. Pelz's device has a number of problems, including: (1) it can handle only one ball at a time; each ball must be spun and marked individually; (2) the special marker for hand marking the golf ball can be easily misaligned by the user during the process of marking, resulting in an incorrectly drawn equator; (3) the ink used for the device is temporary and rubs off onto the club head at impact; (4) the device only provides for an equator; it is not possible to draw any other configuration; (5) the Pelz equator line must be placed in addition to any markings already on the ball; and (6) no matter how careful one is, it is difficult to avoid knocking the ball out of alignment while marking the ball.

There remains a need for an effective method and device for marking golf balls for improved putting.

SUMMARY OF THE INVENTION

The present invention provides a method and device for marking golf balls that allows for the placement of a putting directional indicator (PDI) along the dynamic axis of a ball. While golfers could use the device to mark individual balls after they have been purchased (i.e. after they already have marks on them from the manufacturer), in preferred embodiments, the PDI is applied at the manufacturing stage and/or before the ball has other markings placed upon it. While the PDI could simply consist of one or more lines, in a preferred embodiment, the putting directional indicator may serve as an identifying mark for a manufacturer, distributor or consumer and may be designed to incorporate letters, words, symbols, short sentences, names, initials, numbers, images and photographs.

In one aspect, the invention provides for a spinning and braking device to align a PDI with the dynamic axis of the ball. The ball is spun at a sufficient speed for a sufficient time period to locate its dynamic axis, and a braking mechanism is then employed to retain the ball in a position such that the orientation of its dynamic axis is maintained. Once the ball is at rest, any design for a PDI can be applied. Alternatively, in another aspect, the invention provides for a temporary marking device that marks the spinning ball with a temporary mark. The temporary mark is then used to orient the ball for proper application of the PDI.

BRIEF DESCRIPTION OF THE DRAWING

The invention is described with reference to the several figures of the drawing, in which.

DETAILED DESCRIPTION OF THE INVENTION

Figure 1:
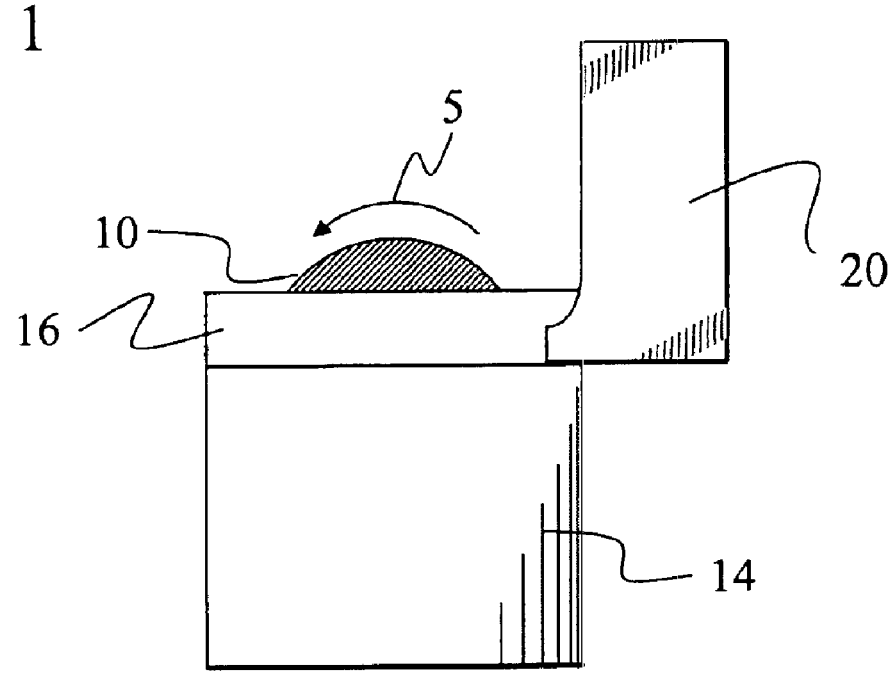
FIG. 1 is a side view of a dynamic axis location device with a braking mechanism and putting directional indicator marking device according to one embodiment of the invention.

Referring now to the figures of the drawing, the figures constitute a part of this specification and illustrate exemplary embodiments of the invention. It is to be understood that in some instances various aspects of the invention may be shown exaggerated or enlarged to facilitate an understanding of the invention.

FIG. 1 is a side view of a dynamic axis locating device with a braking mechanism and marking device according to one embodiment of the invention. In one embodiment, the dynamic axis locating device 14 is a spinning device, for example, that utilizes a system to spin a ball 10 (e.g. a golf ball) in the direction shown by arrow 5 at high speed in order to locate the ball's dynamic axis. The ball is then quickly stopped in place by a braking mechanism 16 and held in a position such that the newly located dynamic axis can be marked by a putting directional indicator (PDI) marking device 20. In a preferred embodiment, the PDI mark is a permanent one, but alternatively, a PDI mark can be only temporarily applied and later removed.

Figure 2:
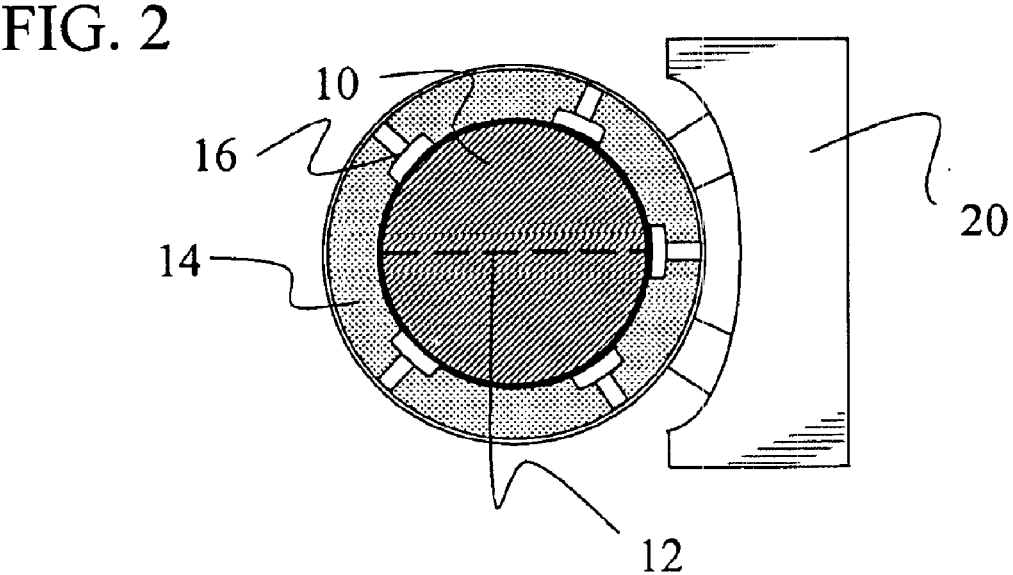
FIG. 2 is a top-down view of a device according to one embodiment of the invention wherein the braking mechanism has been applied and the dynamic axis of a golf ball has been identified.

FIG. 2 is a top-down view of a device according to one embodiment of the invention wherein the braking mechanism 16 has been applied and the dynamic axis 12 has been located. For purposes of illustration, the dynamic axis 12 has been shown as a dotted line in the figure but would not be so marked on the ball. The ball 10 is held in position by the braking mechanism 16 and is ready to be marked with a PDI by a PDI marking device 20. In one embodiment, the braking mechanism 16 may comprise a clamping mechanism that clamps and holds a ball in a fixed position so that the PDI can be marked. The braking mechanism 16 may comprise clamping mechanisms that are applied over multiple equators of the ball, including an embodiment in which the braking mechanism comprises two mirror-image half-spheres that clamp together to stop and hold the ball fixed. The braking mechanism 16 may be manually activated, or alternatively, may be automatically triggered by a system that determines when the dynamic axis has been located. For example, the braking system could be automatically triggered after the ball has been spun for a specified time.

The PDI marking device 20 and braking mechanism 16 have been shown in FIG. 2 as integral units with the dynamic axis locating device 14. Alternatively, each of these devices could comprise separate, non-integral devices. In one embodiment, the PDI marking device 20 may comprise a laser system to mark the PDI with a permanent mark. (See, for example, U.S. Pat. Nos. 5,651,741 to Masutani et al. and U.S. Pat. No. 5,248,878 to Ihara which disclose the use of lasers to make marks on golf balls, the teachings of which are incorporated herein by reference). In another embodiment, the PDI mark may be sprayed onto the ball and comprise UV or electron beam curable ink as described in U.S. Pat. Nos. 6,013,330 and 5,968,605 both to Lutz, the teachings of which are incorporated herein by reference. These preferred embodiments utilizing lasers or inks allow an application of the PDI that does not involve physical contact of the PDI marking device and ball. Such an application process helps reduce the chance of knocking the ball out of alignment while marking the ball. However, in yet another embodiment, the PDI marking device 20 may comprise a mechanical device that imprints or etches the PDI on the ball. All of these embodiments allow the device to apply the mark from multiple locations instead of applying the mark at only one contact point.

FIGS. 3A–3D illustrates example designs for a PDI 22 marked along the dynamic axis 12 of the ball 10. In each example shown in FIGS. 3A–3D, the dynamic axis 12 is along the dotted line (the dotted line is not part of the PDI). While the PDI 22 could simply consist of one or more lines, in certain preferred embodiments, the PDI 22 incorporates letters, words, short sentences, symbols, names, initials, numbers, images, photographs or other types of mark and may be an identifying mark for a manufacturer, distributor or consumer. The PDI may be any shape that indicates the optimal equator roll line and may be any color or combination of colors. The PDI 22 can therefore serve dual functions in providing information to the user, such as the identity of the manufacturer, as well as indicating the dynamic axis 12 of the ball 10. The PDI 22 may be marked at the manufacturing stage of the golf ball and configured such that it is the only mark on the golf ball, thereby providing all necessary identifying information and reducing the marking confusion that can result from multiple markings. Alternatively, the PDI 22 may be applied by a distributor or user after manufacture so as to allow for personalized designs.

Figure 3A:
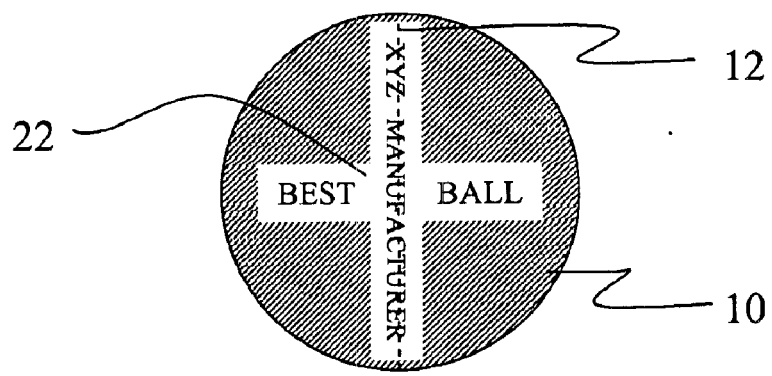
FIGS. 3A–3D illustrate example designs for putting directional indicators according to multiple embodiments of the invention.
Figure 3B:
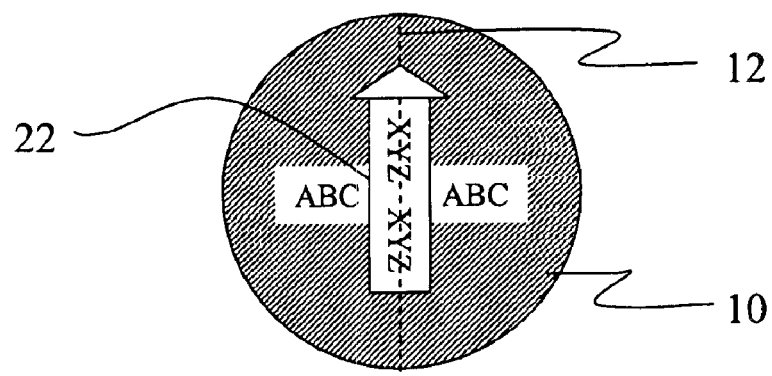
Figure 3C:
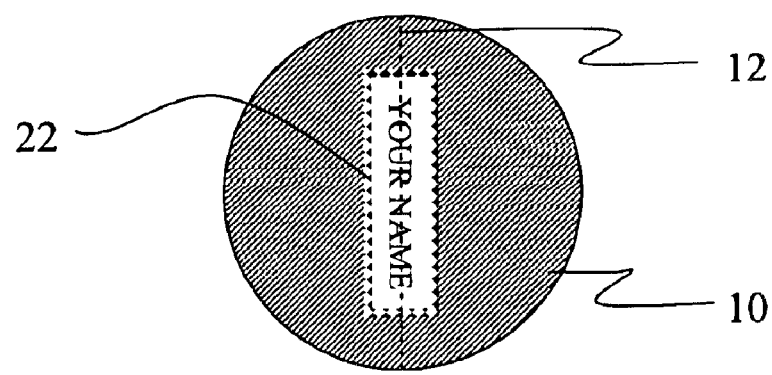
Figure 3D:
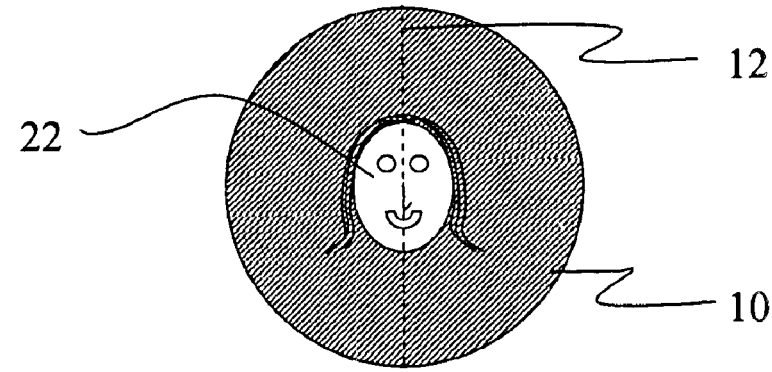

FIG. 3A shows a sample PDI 22 in which the words serve to indicate the dynamic axis on the surface of the ball while also indicating the manufacturer of the ball. It is also possible to mark the PDI 22 in a "cross" or "plus" pattern instead of simply marking the PDI in a single plane of the ball. FIG. 3B illustrates the use of a symbol (in this case an arrow) to indicate the dynamic axis, while words in a cross pattern can be used for identification and as an aid to a user in aligning the face of a golf club head with the dynamic axis. FIGS. 3C and 3D show how a user can customize the PDI 22 with words, symbols, short sentences, numbers, names, initials, images or photographs selected by the user and which may be as whimsical or personalized as desired, including such designs as the user's name or an image of the user's family. In an example like the face shown in FIG. 3D, it is important that the user understand and recognize how the PDI is shown in the picture, such as in this case where the dynamic axis 12 is indicated by a line along the nose and through the parting of the hair.

In an alternative embodiment, instead of rapidly braking the spinning motion of the golf ball and holding it in position to be permanently marked with a PDI, a temporary mark is used. A golf ball for which a dynamic axis has been identified can be marked by a temporary marking device as the golf ball is spinning. The rotation of the ball is stopped without the concern of maintaining the orientation of the dynamic axis and then the ball is permanently marked with a PDI where the placement of the PDI by the PDI marking device is guided by the temporary mark. The applied temporary mark and method of orienting the PDI may be accomplished using a variety of methods. In one embodiment, the temporary mark may be one that is capable of being optically recognized by a orientation device, such as a bar code for example. The temporary mark acts as a guide for orienting the PDI marking device. In one embodiment, the orientation device may have a component that recognizes the temporary mark and a component that incrementally rotates the ball into a position suitable for marking by the PDI marking device. For example, a temporary mark may be applied that is recognizable by a laser orientation device, such as transparent ink or a visible bar code optically recognizable by a laser. The laser may be incorporated as part of the PDI marking device or could be a separate stand-alone orientation device. In an alternative embodiment, the same device that recognizes the temporary mark could apply the PDI, for example the same laser system could optically recognize the temporary mark and apply the PDI.

Figure 4:
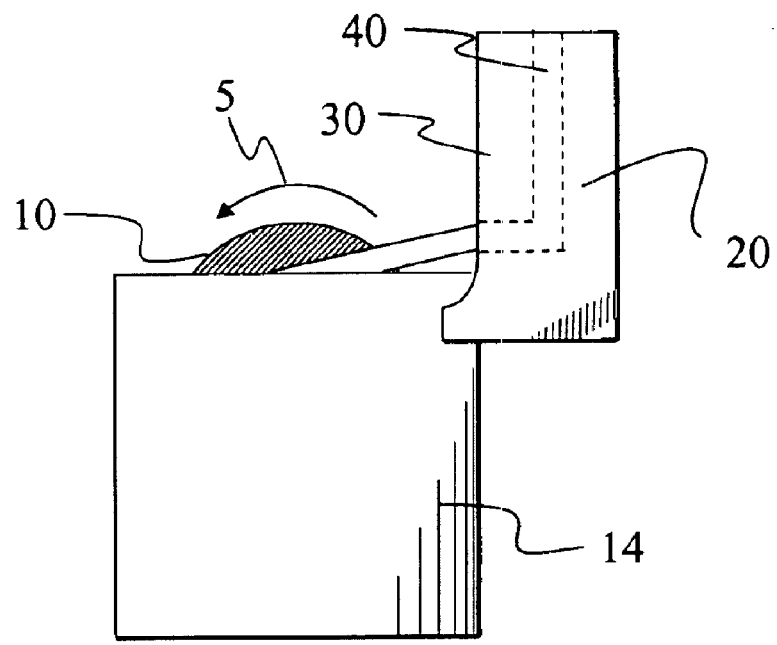
FIG. 4 is a side view of a device having a temporary marking unit according to one embodiment of the invention.
Figure 5:
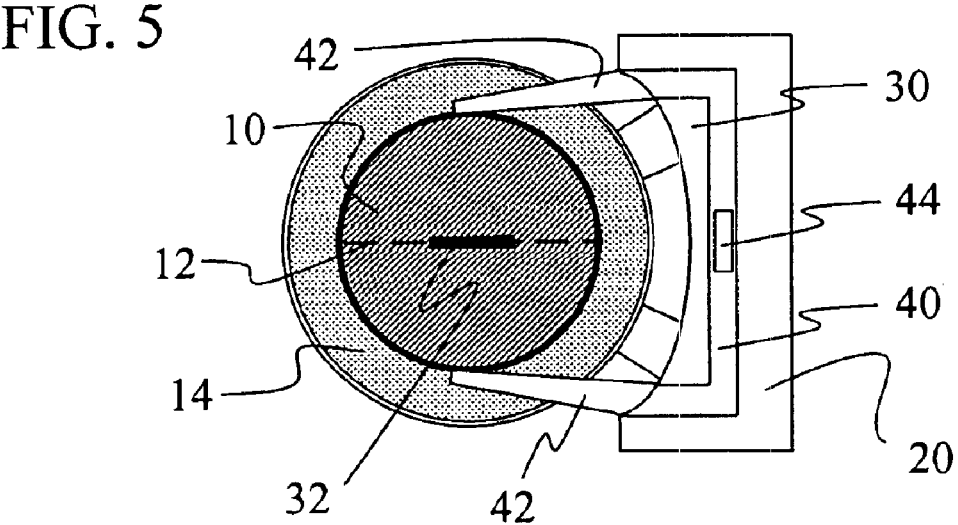
FIG. 5 is a top-down view of a device having a temporary marking unit according to on embodiment of the invention.

FIG. 4 is a side view of a device having a temporary marking device 30 and orientation device 40 according to one embodiment of the invention, and FIG. 5 is a top-down view of the device. After the dynamic axis 12 has been located by the dynamic axis locating device 14 (for example, a spinning device that spins the ball 10 in the direction of arrow 5), the temporary marking device 30 makes a temporary mark 32 on the golf ball 10. The temporary mark 32 serves as a guide for the PDI marking device 20 or alternatively for an orientation device 40 that orients the ball so that the PDI marking device 20 properly marks the PDI 22 to indicate the dynamic axis 12. The orientation device 40 could comprise a rotation mechanism 42 for incrementally rotating the ball 10 and a recognition mechanism 44 for recognizing the temporary mark 32 such that the ball 10 is oriented in the proper orientation for the PDI marking device 20 to mark the PDI 22.

In another embodiment, the applied temporary mark 32 may have magnetic properties that would be magnetically recognized by the PDI marking device 20 or orientation device 40 for purposes of orienting the PDI 22. If the temporary mark 32 is visually transparent it will not be necessary to separately remove it. However, if the temporary mark 32 is visible, then the mark will preferably be removed at some point during or after the PDI marking process. In a preferred embodiment, the temporary mark is applied by spraying the temporary marking material, for example magnetic ink, onto the ball. By applying the temporary mark in this manner, the chance of knocking the ball out of alignment while marking the ball is reduced. In an alternative embodiment, the temporary mark may be applied by physical contact of the temporary marking device and ball.

Figure 6A:
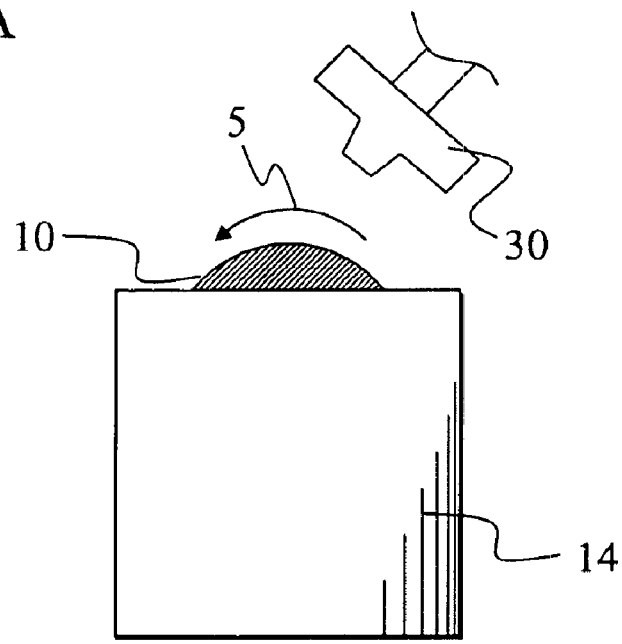
FIGS. 6A–6C is a schematic illustration of separate, non-integral devices for marking putting directional indicators according to one embodiment of the invention.
Figure 6B:
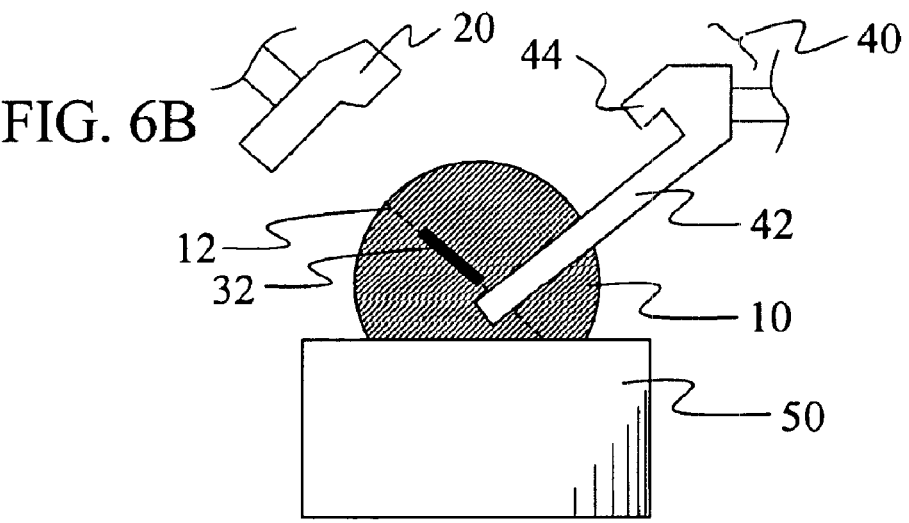
Figure 6C:
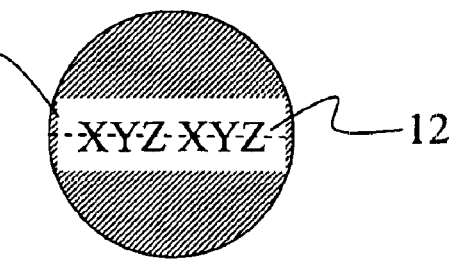

FIGS. 6A–6C illustrate an alternative embodiment of the present invention in which the dynamic axis locating device 14, the temporary marking device 30, the orientation device 40, and the PDI marking device 20 are separate, non-integral units that act on the ball 10 in successive operations. FIG. 6A illustrates the process wherein the ball 10 is spun in direction of the arrow 5 to locate the dynamic axis 12, as in the embodiment with devices as an integral unit. Once the dynamic axis 12 has been located, the temporary marking device 30 sprays or otherwise marks the ball 10 with a temporary mark 32 to indicate the dynamic axis 12 on the ball 10. The ball 10 then exits the dynamic axis locating device 14 (in this case, the spinning device). FIG. 6B illustrates the process wherein the PDI mark is made on the ball. Once the ball exits the dynamic axis locating device 14, it is positioned on a platform 50 which allows it be easily rotated. The orientation device 40 has a rotation mechanism 42 for incrementally rotating the ball and a recognition mechanism 44 for recognizing the temporary mark 32. The orientation device 40 rotates the ball 10 on the platform 50 until the temporary mark 32 and dynamic axis 12 are in the proper orientation to be marked with a PDI 22 by the PDI marking device 20. Once the PDI 22 has been marked, it is possible at this stage to remove the temporary mark 32. For example, the platform 50 could comprise a fluid bearing to allow for the easy rotation of the ball and also provide for the removal (e.g. dissolving) of the temporary mark 32. FIG. 6C illustrates the finished ball 10 marked with a PDI 22 to indicate the position of the dynamic axis 12.

Figure 7:
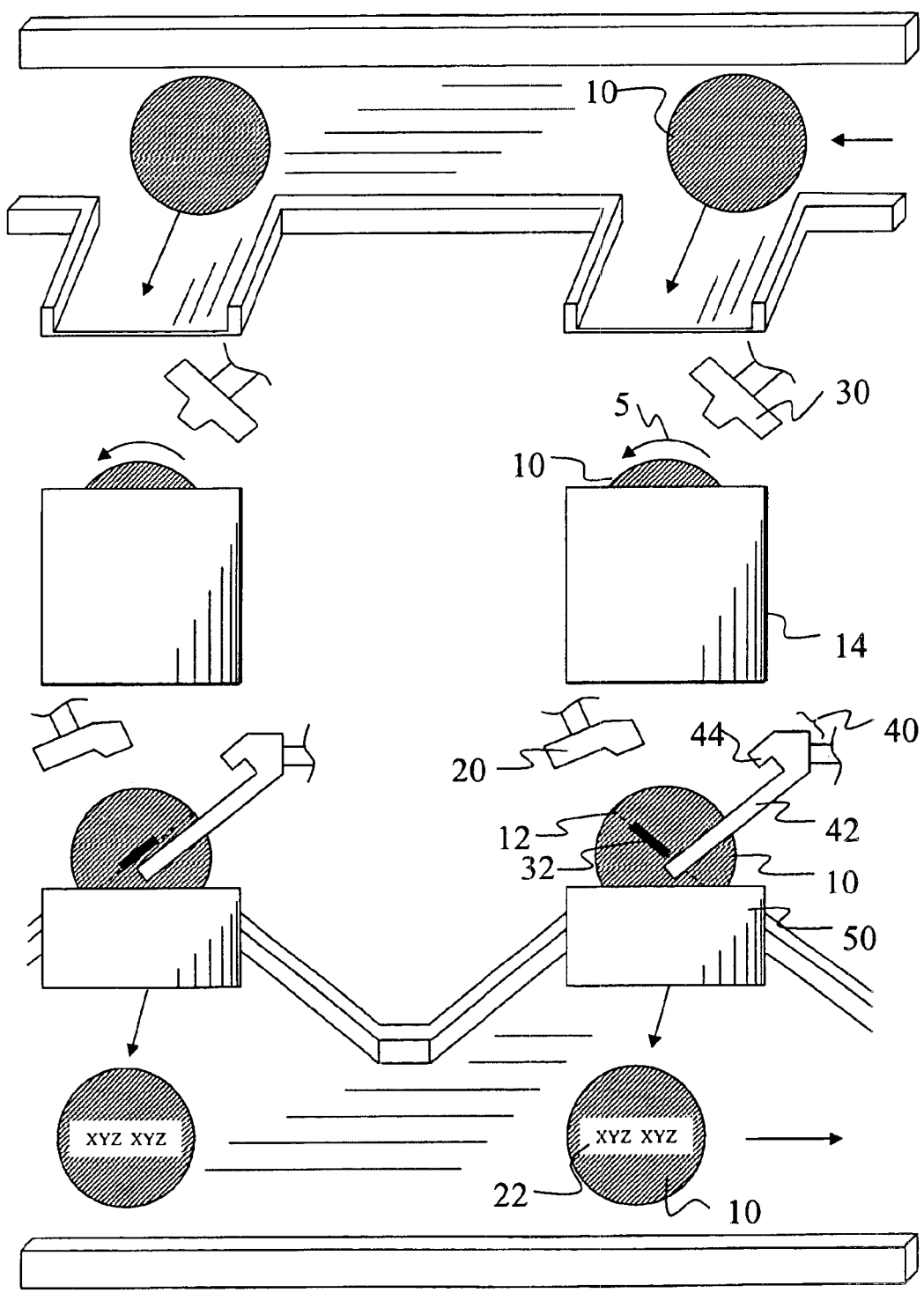
FIG. 7 is a schematic illustration of a marking device in which the dynamic axis for multiple balls is identified and marked in an assembly-line fashion according to one embodiment of the invention.

FIG. 7 illustrates a marking device in which multiple balls are marked in an assembly-line format according to one embodiment of the invention. Such a device would be advantageous in a commercial setting where manufacturers need to mark multiple balls in a commercially feasible manner. The assembly-line would allow a flow of golf balls through the system and provide a quick and efficient means for continuously marking multiple golf balls. Any of the embodiments disclosed could be incorporated into an assembly-line system; however, the embodiment of the invention involving the application of a temporary mark 32 to orient the application of the PDI 22 along the dynamic axis 12 would be particularly suited for such an assembly-line system.

In a preferred embodiment, the assembly-line system incorporates the concept of the dynamic axis locating device 14, temporary marking device 30, orientation device 40, and PDI marking device 20 as separate, non-integral devices performing successive operations on a flow of golf balls 10 (see FIGS. 6A–6C). The steady-state operation of this system comprises a continuous stream of balls 10 as "works in process" flowing through each stage of the assembly-line system and resulting in a finished ball having the PDI 22 marked along its dynamic axis. The assembly-line system may incorporate the use of ramps, chutes, conveyor-belts and other mechanisms for delivering balls between each marking stage. The assembly-line system may be automatically operated based on allocating a certain amount of time for each marking stage before advancing each "work in process" ball onward to the next stage.

Although a preferred embodiment for the PDI is for use in putting, the PDI could be used to indicate the desired direction in any golf shot where the golfer is allowed to align the golf ball—i.e. on the Tee or any time on the green where the golfer is allowed to place the ball. Such ball alignment would have two benefits. First, it would facilitate club and body alignment of the golfer, thus increasing the likelihood of a shot going to its intended target. Second, by having the ball aligned along its optimal equator, a more true hit (i.e. less unexpected spin) can be achieved.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A ball marking device, comprising:
   a marking device for marking a putting directional indicator on a dynamic axis of a ball; and
   a braking mechanism, wherein said braking mechanism stops movement of said ball with respect to said marking device and holds said ball in a position that allows said marking device to mark said putting directional indicator on said dynamic axis.

2. The ball marking device of claim 1, further comprising:
   means for locating said dynamic axis of said ball.

3. The ball marking device of claim 1, wherein said marking device is adapted to mark the putting directional indicator when said putting directional indicator includes a design other than that of a circumferential line.

4. The ball marking device of claim 3, wherein said design comprises:
   an identifying mark.

5. The ball marking device of claim 4, wherein said identifying mark is selected from the group consisting of: letters, words, short sentences, symbols, names, initials, numbers, images, photographs, crosses, decorative marks, and any combination thereof.

6. The ball marking device of claim 1, wherein said marking device and said braking mechanism comprise separate, non-integral devices.

7. The ball marking device of claim 1, wherein said marking device comprises a laser marking system.

8. A method of marking a ball, comprising:
   locating a dynamic axis of a ball;
   identifying said dynamic axis;
   stopping movement of said ball;
   holding a position of the ball fixed so that said dynamic axis is at a specific location; and
   marking a putting directional indicator along said dynamic axis,
   wherein said locating, identifying and marking steps are automated.

9. The method of claim 8, further comprising:
   performing all of said steps on multiple balls in a flow of balls through an automated assembly-line.

10. The method of claim 8, wherein said putting directional indicator comprises:
    a design other than that of a circumferential line.

11. The method of claim 10, wherein said design comprises:
    an identifying mark.

12. The method of claim 11, wherein said identifying mark is selected from the group consisting of: letters, words, short sentences, symbols, names, initials, numbers, images, photographs, crosses, decorative marks, and any combination thereof.

* * * * *